United States Patent [19]

Muise

[11] Patent Number: 4,580,718
[45] Date of Patent: Apr. 8, 1986

[54] CONTAINER WITH TUCK-IN CLOSURE

[75] Inventor: Herbert D. Muise, Orange, Calif.

[73] Assignee: Weyerhaeuser Company, Tacoma, Wash.

[21] Appl. No.: 592,167

[22] Filed: Mar. 22, 1984

[51] Int. Cl.[4] .................. B65D 5/12; B65D 43/02
[52] U.S. Cl. ...................... 229/45 R; 229/23 R; 229/37 R; 229/37 E; 229/43
[58] Field of Search .............. 229/23 R, 23 BT, 43, 229/44 R, 37 R, 37 E, 38, 45 R

[56] References Cited

U.S. PATENT DOCUMENTS

| | | | |
|---|---|---|---|
| 1,119,208 | 12/1914 | Weiss | 229/23 R |
| 2,228,604 | 1/1941 | Luce | 229/45 R |
| 2,453,829 | 11/1948 | Blackman | 229/23 R |
| 2,474,523 | 6/1949 | Guyer | 229/37 E |
| 2,597,848 | 5/1952 | Reeser | 229/45 R |
| 2,730,287 | 1/1956 | Mueller | 206/594 |
| 2,752,032 | 6/1956 | Fish | 229/37 E X |
| 2,874,891 | 2/1959 | Kelsall | 229/37 |
| 3,178,093 | 4/1965 | Wasyluka | 229/37 E |
| 3,352,475 | 11/1967 | Centanni | 229/45 X |
| 3,365,114 | 1/1968 | Macchi | 229/38 |
| 3,942,712 | 3/1976 | Bundy et al. | 206/624 |
| 3,954,221 | 5/1976 | Johnson | 229/37 E |
| 3,955,747 | 5/1976 | Bell | 229/37 E |
| 4,046,309 | 9/1977 | Poggiali | 229/23 R |
| 4,148,429 | 4/1979 | Burr et al. | 229/45 R X |
| 4,254,903 | 3/1981 | Kuehlhorn | 229/45 R |
| 4,341,337 | 7/1982 | Beach, Jr. et al. | 229/23 BT |
| 4,530,459 | 7/1985 | Maroszek | 229/45 R |

FOREIGN PATENT DOCUMENTS

| | | | |
|---|---|---|---|
| 1193878 | 11/1959 | France | 229/37 R |
| 2383838 | 11/1978 | France | 229/23 BT |
| 2453083 | 12/1980 | France | 229/43 |
| 7512560 | 4/1976 | Netherlands | 229/44 R |
| 1210753 | 10/1970 | United Kingdom | 229/44 R |

Primary Examiner—William Price
Assistant Examiner—Gary E. Elkins

[57] ABSTRACT

A container that is easily openable, reclosable, reusable and storable in a lay-flat condition between uses. The container has a tuck-in closure. In this closure the cover panels are hingedly attached to triangular tuck-in end closure panels which fold over and then fold behind a flange on the upper edge of the container. The flange can be formed in the container at the time of its manufacture. The flange may also be a two-part flange provided by a two-piece container having separate body and cover elements. The body has a downwardly extending flange along its upper edge and the cover has an upwardly extending flange along its lower edge. The cover telescopes over the body and the cover flange locks behind the body flange. The closure panels then fold over and lock behind this flange.

11 Claims, 18 Drawing Figures

CONTAINER WITH TUCK-IN CLOSURE

BACKGROUND OF THE INVENTION

Small parts or items often are transported and inventoried in a container. It is preferred that the container be easily openable, reclosable, reusable and storable in a lay-flat conditions between uses. The usual style of container used for this purpose is a regular slotted container (RSC) or a Pres-Seal style container. The RSC must be taped, stapled or glued and cannot easily be collapsed to a lay-flat condition between uses. The Pres-Seal style container shown in Kelsell, U.S. Pat. No. 2,874,891 must be stored in a manner that prevents the containers from being adhered together and in an environment that prevents dirt from masking the adhesive surface.

SUMMARY OF THE INVENTION

The inventor wished to overcome the problems of the standardly used containers and to provide a container that met the requirements of a parts box—easily openable, reclosable, reusable and storable in a lay-flat condition between uses. He decided that a different type of closure was required in order to provide easy openability and reclosability. This was done by providing a tuck-in closure.

In the tuck-in closure, the cover panels are hingedly attached to triangular tuck-in end closure panels which fold over and then fold behind a flange on the upper edge of the container. This flange can be formed in the container at its time of manufacture.

The preferred form of flange is a two-part flange provided by a two-piece container, the body and the cover. The body has a downwardly extending flange along its upper edge and the cover has an upwardly extending flange along its lower edge. The cover telescopes over the body and the cover flange locks behind the body flange. The closure panels then fold over and lock behind this flange.

DESCRIPTION OF THE PREFERRED EMBODIMENTS

Figures 1, 8:
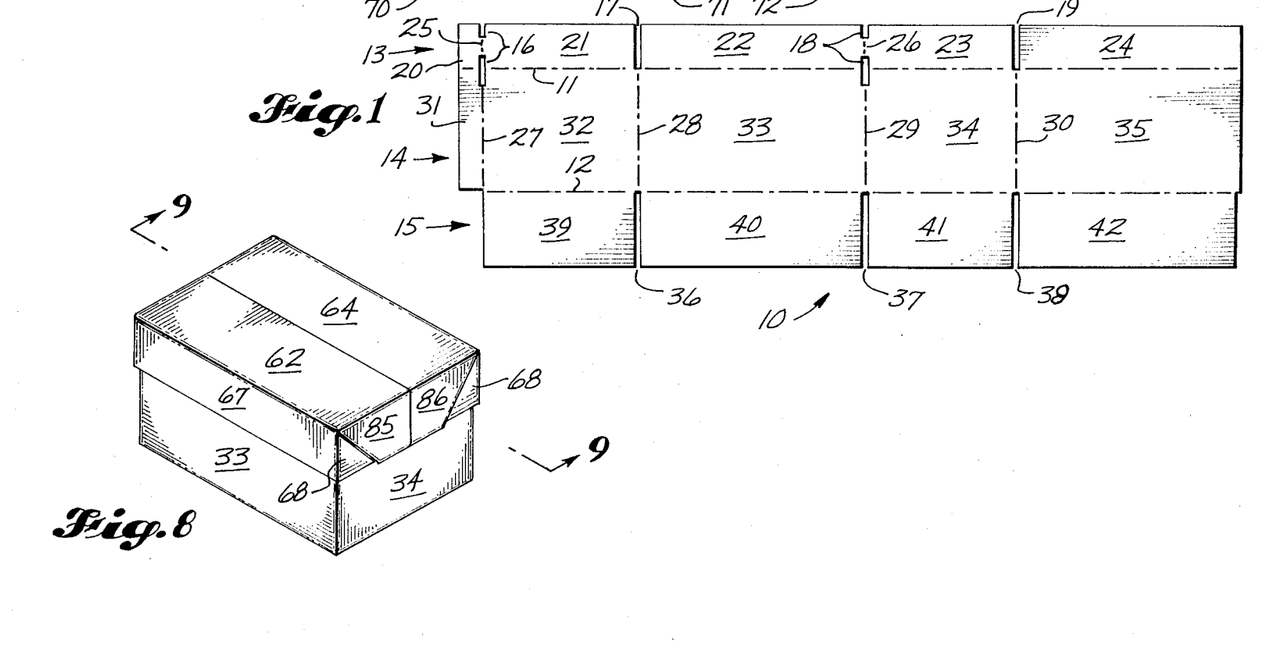
FIG. 1 is a top plan view of the blank of the body of the container.
FIG. 8 is an isometric view of the closed container with the cover locked in position.

FIG. 1 shows the blank 10 for the container body. Blank 10 is divided by longitudinal score lines 11 and 12 into an upper flange section 13, a side panel section 14, and a lower closure section 15.

Slots 16, 17, 18, and 19 divide the upper flange section 13 into a glue flap 20, a first minor upper flange element 21, a first major upper flange element 22, a second minor upper flange element 23, and a second major upper flange element 24. The glue flap 20 and the first minor upper flange element 21 are connected by web 25 which extends across the slot 16, and the first major upper flange element 22 and the second minor upper flange element 23 are joined by web 26 which extends across slot 18.

The side panel section 14 is divided by score lines 27, 28, 29, and 30 into glue flap 31, a first minor side panel 32, a first major side panel 33, a second minor side panel 34, and a second major side panel 35.

The bottom closure illustrated in FIG. 1 is the bottom closure for a regular slotted container. The bottom closure section 15 is divided by slots 36, 37, and 38 into a first minor bottom closure panel 39, a first major bottom closure panel 40, a second minor bottom closure panel 41, and a second major bottom closure panel 42. There is no bottom closure panel associated with the glue flap 31.

The slot 16 and score line 27 are aligned. The slot 17, score line 28 and slot 36 are aligned. The slot 18, score line 29 and slot 37 are aligned, and the slot 19, score line 30 and slot 38 are aligned. The slots 16 and 18 extend slightly into the side panel section 14.

In forming the container body, glue is placed on the glue flaps 20 and 31. The first minor side panel 32 with its associated flange 21 and bottom closure panel 39 and the associated glue flaps 31 and 20 are bent inwardly around score line 28 until they overlie the panel 33. The second major side panel 35 and its associated flange 24 and bottom closure panel 42 are folded inwardly around score line 30 until the glue flaps 20 and 31 are against the panels 35 and flange 24 and adhered to them.

The webs 25 and 26 connecting a major and minor flange element allows these flange elements to be bent outwardly around score line 11 to form flanges in the container when the container body is in a lay-flat condition and to lock these flanges in their downwardly extending position when the container body is set up.

Figure 2:
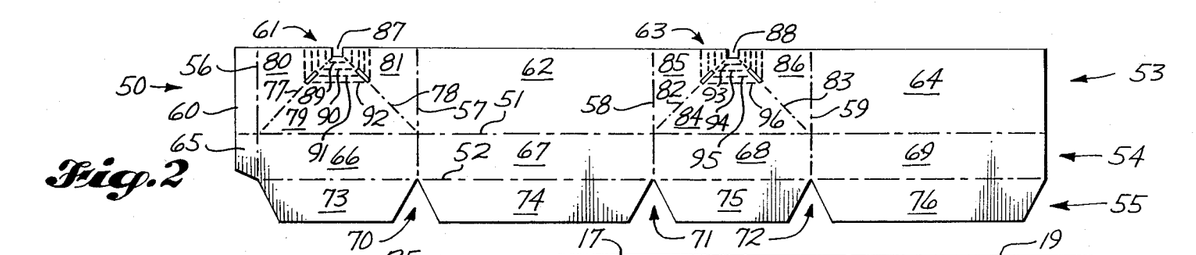
FIG. 2 is a top plan view of the blank of the container cover.

FIG. 2 shows the blank 50 for the upper closure of the container. The blank 50 is divided by longitudinal score lines 51 and 52 into a cover closure section 53, an outer flange section 54, and an inner flange section 55. Score lines 56, 57, 58 and 59 divide the cover closure section 53 into a glue flap 60, a first end closure panel 61, a first cover panel 62, a second end closure panel 63, and a second cover panel 64, and divide the outer flange section 54 into glue flap 65, a first minor outer flange element 66, a first major outer flange element 67, a second minor outer flange element 68, and a second major outer flange element 69. Slots 70, 71, and 72 divide the inner flange section 55 into a first minor inner flange element 73, a first major inner flange element 74, a second minor inner flange element 75, and a second major inner flange element 76. Each of the inner flange elements is trapezoidal in shape to allow the flange sections of the cover and body of the container to telescoped more easily.

Figures 3, 4, 5, 7:
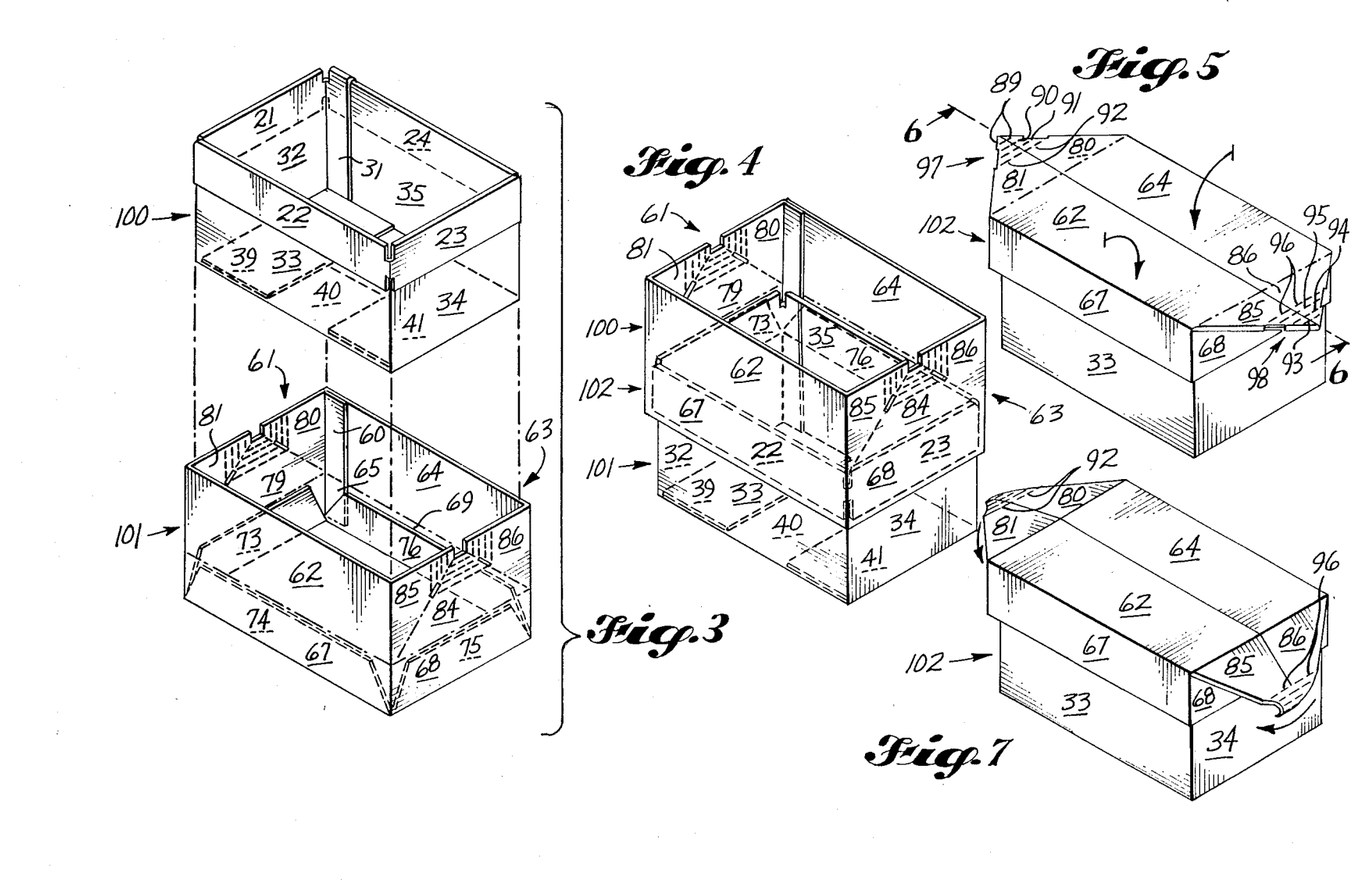
FIG. 3 is an isometric exploded view of the container showing how the cover and body of the container are telescoped together.
FIG. 4 is an isometric view of the container with the cover and body of the container telescoped together and the top open.
FIG. 5 is an isometric view of the container showing the cover panels closed over the top of the container.
FIG. 7 is an isometric view showing the container cover being locked.
Figure 6:
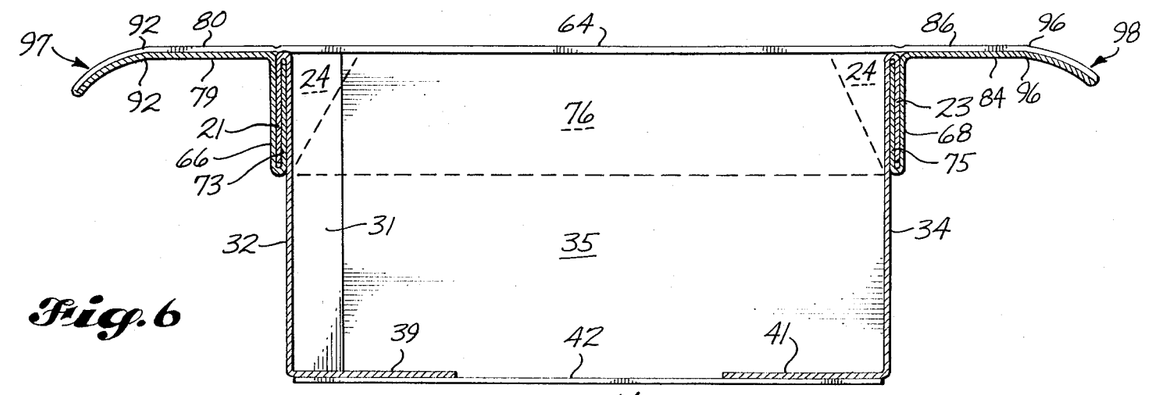
FIG. 6 is a cross sectional view taken through line 6—6 of FIG. 5.

FIGS. 3, 4 and 6 show how the flange elements of the container body 100 and the container cover 101 telescope together. The flange elements 21-24 on the container body are bent back over the side panels 32-35 as described above, the container body is squared and the bottom closure folded into place. This is shown in FIG. 3. The minor bottom closure panels 39 and 41 are bent inwardly, and the major bottom closure panels 40 and 42 are bent inwardly underneath them and fastened to them.

The upper closure is formed in a manner similar to that of the container body. The panels 61, 66, 73 and the associated glue flaps 60 and 65 are bent inwardly around score line 57 and glue is placed on glue flaps 60 and 65. The panels 64, 69 and 76 are then bent inwardly around score line 59 and the panels 64 and 69 adhered to the glue flaps 60 and 65 respectively.

The container cover is squared and the inner flange elements 73-76 are bent inwardly. The cover is telescoped upwardly over the body as shown in FIG. 3. The inner cover flange elements 73-76 are between the body flange elements 21-24, and the side panels 32-35. The outer cover flange elements 66-69 are on the outer face of the body flange elements 21-24. This forms container 102. This is shown in FIGS. 4 and 6.

Cover panels 62 and 64 are then bent inwardly around score line 51 to cover the top of the container. Closure panels 61 and 63 are scored to allow this. This is shown in FIG. 2.

The first end closure panels have oblique score lines extending from the center of the outer edge of the closure panel to the inner corners of the panel. First end closure panel 61 has oblique score lines 77 and 78, which form a substantially triangular central section 79 and two substantially right triangular outer sections 80 and 81. The second end closure panel 63 has oblique score lines 82 and 83, which divide the panel into a substantially triangular central section 84 and two substantially right triangular outer sections 85 and 86.

When the cover panels 62 and 64 are bent down over the top of the container, the end closure panels 61 and 63 bend along the oblique score lines 77 and 78, and 82 and 83 to form the triangular closure sections shown in FIG. 5.

The outer end of this triangular section is scored and relieved to form tuck-in locking sections which tuck behind the flange 102 formed on the container. The closure panels 61 and 63 are relieved at their central outer edge as shown at 87 and 88. The drawings show these as small U-shaped or square sections. They may be trapezoidal in outline with the outer edge of the relief being wider than the inner edge of the relief.

A series of U-shaped score lines surround the relief. Score lines 89, 90, 91 and 92 surround relief 87 and score lines 93, 94, 95 and 96 surround relief 88. Each of the U-shaped score lines 89-96 is formed of three straight score line sections that meet at the diagonal score lines 77-78 or 82-83. When the outer closure panel is formed into its triangular shape as shown in FIG. 5, the score line sections in end closure panel sections 80 and 81 will be aligned with their corresponding score line section in end closure panel section 79 and the score line sections in end closure panel sections 85 and 86 will be aligned with the corresponding score line sections in end closure panel section 84.

Figure 9:
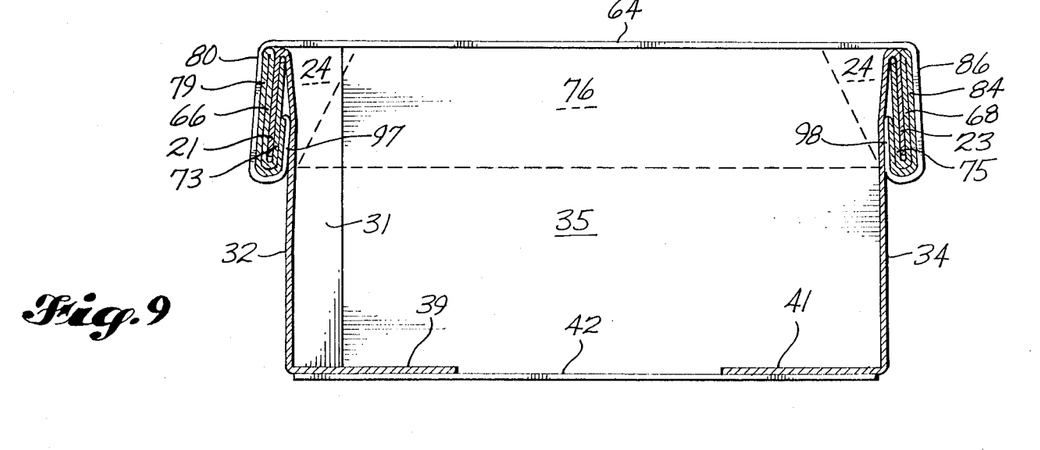
FIG. 9 is a cross-sectional view taken through line 9—9 of FIG. 8.

The score lines 89-92 and 93-96 may be spaced in any manner. Their purpose is to allow the tuck-in sections 97 and 98 of the end closure panels to be bent up behind the flange 102 as shown in FIGS. 7, 8 and 9. These score lines define the tuck-in sections 97 and 98. The tuck-in sections are folded back and extend between the flange elements 73 and 75 and the side panels 32 and 34. The distances between score line 51 and the innermost score line 92 on panel 61, and between the score line 51 and the innermost score line 96 on panel 63 are each substantially equal to the distance between the score lines 51 and 52, which define the width of the flange element 102.

Figure 16:
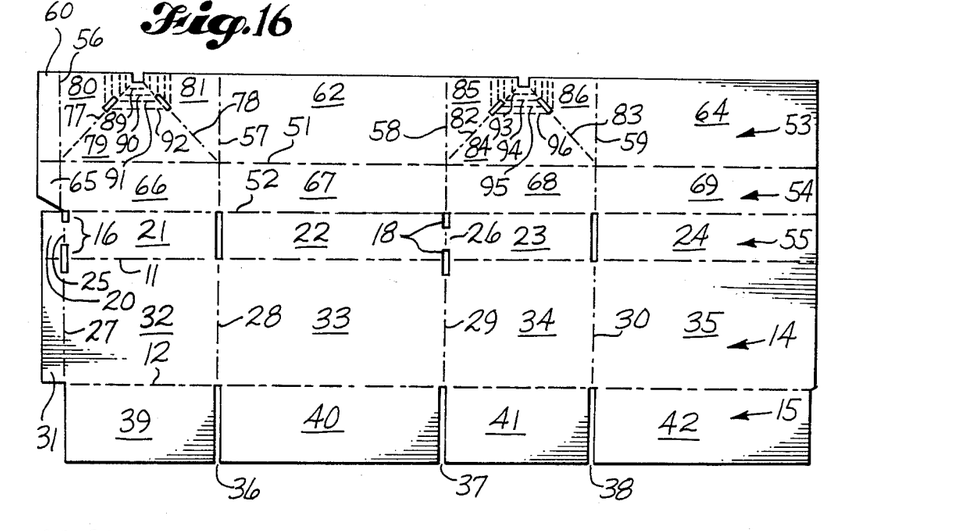
FIG. 16 is a top plan view of a blank for a body of a modified container.
Figure 17:
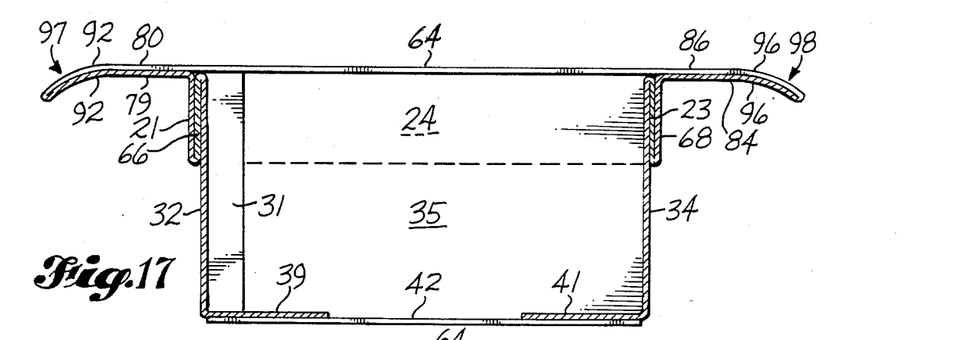
FIGS. 17–18 are cross sectional views of the container formed from the blank of FIG. 16 and corresponding to FIGS. 6 and 9 respectively.
Figure 18:
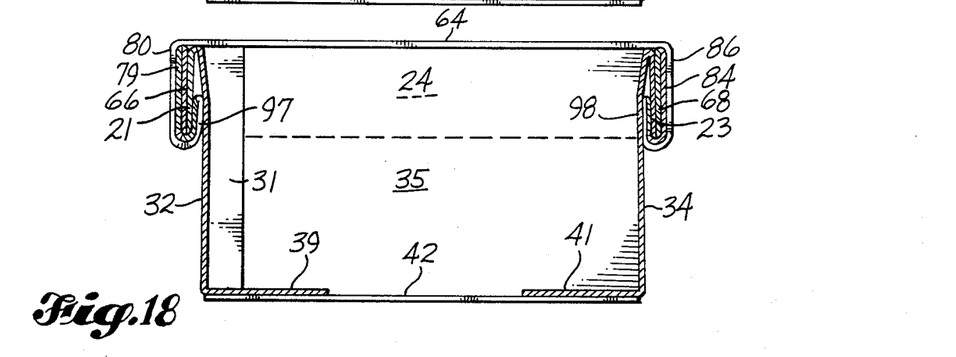

The container may be made in one piece instead of the two shown. In that case the flange elements 73-76 would be omitted from the blank 50 and the flange elements 66-69 would be attached to the upper edge of flange elements 21-24 along score line 52. The glue flap 65 would remain separated from the glue flap 20. In the formation of the container at the corrugated plant, the flange would be formed by bending the blank along score lines 11 and 52 to form the flange prior to adhering the glue flaps 60, 65, 20 and 31 of the manufacturer's joint to the side panels. This is shown in FIGS. 16-18.

Although a regular slotted container bottom closure has been shown, the preferred bottom closure is a self-closing bottom closure. This is shown in in FIGS. 10-15.

Figures 10, 11, 12:
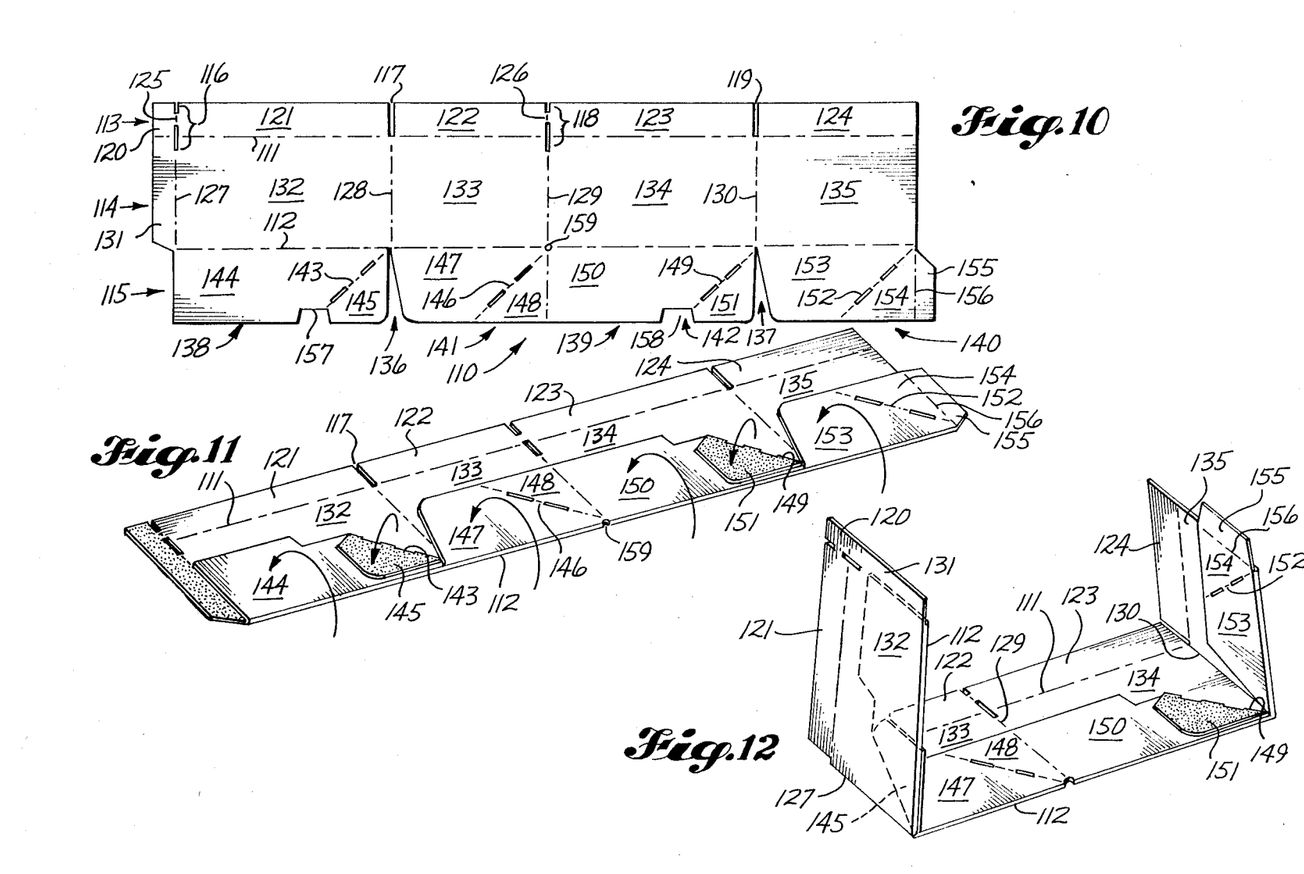
FIG. 10 is a top plan view of a blank for a body of a container having a modified bottom closure.
FIGS. 11–12 are isometric views showing the formation of the bottom closure.

The blank 110 is divided by longitudinal score lines 111 and 112 into a flange section 113, a side panel section 114 and a bottom closure section 115.

The flange section 113 is divided by transverse slots 116, 117, 118 and 119 into a glue flap 120, a first major flange element 121, a first minor flange element 122, a second major flange element 123 and a second minor flange element 124. A web member 125 extends across slot 116 to connect a glue flap 120 and the first major flange element 121, and a web member 126 extends across slot 118 to connect the first minor flange element 122 and second major flange element 123. The slots 116 and 118 extend into the side panel section 114.

The side panel section 114 is divided by transverse score lines 127, 128, 129 and 130 into a glue flap 131, a first major side panel 132, a first minor side panel 133, a second major side panel 134 and a second minor side panel 135. The score lines 127-130 are aligned with the slots 116-119.

Bottom closure section 115 is divided by tapered slots 136 and 137 into a first major bottom closure panel 138, a bottom closure element 139 and a second minor bottom closure panel 140. The bottom closure element 139 is divided by score line 129 into a first minor bottom closure panel 141 and a second major bottom closure panel 142.

The first major bottom closure panel 138 is divided by an oblique score line 143 into a first bottom closure panel section 144 and a closure flap 145. The score line 143 extends from the inner corner of the first major bottom closure panel 138 formed by the intersection of score line 112 and 128 outwardly to the outer edge of the panel 138.

The first minor bottom closure panel 141 is divided by oblique score line 146 into a first bottom closure panel section 147 and a second bottom closure panel section 148. The score line 146 extends from the corner of the panel 141 formed by the intersection of score lines 112 and 129.

The second major bottom closure panel 139 is divided by oblique score line 149 into a first bottom closure panel section 150 and a closure flap 151. The oblique score line 149 extends from the corner of the panel 139 formed by the intersection of score lines 112 and 130.

The second minor bottom closure panel 140 is divided by oblique score line 152 into a first bottom closure panel section 153 and a second bottom closure panel section 154. The score line 152 extends from the corner of panel 140 formed by the intersection of the score line 112 and the side edge of the blank.

Each of the oblique score lines 143, 146, 149 and 152 extends at an angle of 45° to the score line 112. The oblique score lines are parallel.

A glue flap 155 is hingedly attached to the side edge of bottom closure panel section 154 by score line 156.

The major bottom closure panels have reliefs on their outer edge—relief 157 on panel 138 and relief 158 on panel 139. The container body is relieved at 159, the intersections of score lines 112 and 129.

In forming the bottom closure, the bottom closure panels 138, 141, 142 and 140 are bent around score line 112 until they are contiguous with the side panels 132–135. The flaps 145 and 151 are bent outwardly around score lines 143 and 149 until they overlie their adjacent panel sections 144 and 150. Adhesive is placed on the flaps 145 and 151 and the glue flaps 120, 131 and 156.

The blank is then bent inwardly around score lines 128 and 130, the panel 135 being folded down first and the panel 132 being folded down afterwards. This causes the glue flap 120 to be adhered to the flange element 124, the glue flap 131 to be adhered to the side panel 135, the glue flap 156 to be adhered to the bottom closure panel section 144, the glue flap 145 to be adhered to the bottom closure panel section 147 and the glue flap 151 to be adhered to the bottom closure panel section 153.

Figures 13, 14:
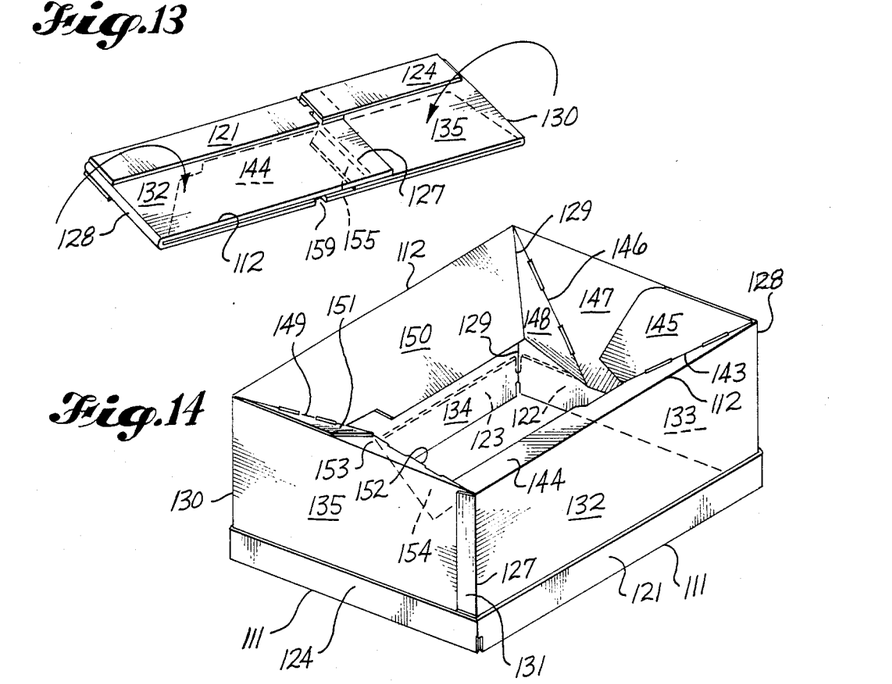
FIG. 13 is an isometric view of the modified lay-flat container body.
FIGS. 14–15 are isometric views showing the container body and the modified bottom closure being formed.
Figure 15:
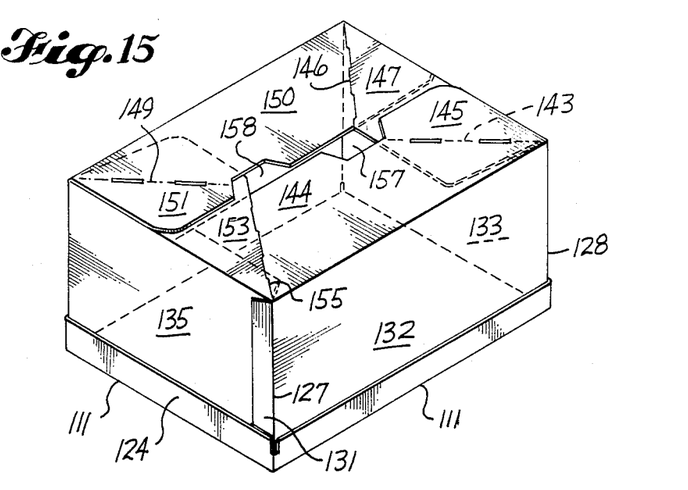

When the container body is set up, the major bottom closure panels 138 and 142 will form into a common plane and the minor bottom closure panels 140 and 141 will be folded on themselves along score lines 152 and 146.

The container may be easily closed and opened and may be reused many times.

I claim:

1. A container comprising
four side panels hingedly connected together,
a flange extending around said side panels, the upper edge of said flange being aligned substantially with the upper edges of said side panels and the lower edge of said flange being below the upper edges of said side panels,
said flange comprising a first and a second pair of opposed flanges,
a top closure on said container, said top closure comprising
cover panels hingedly connected to the upper edges of said first pair of opposed flanges,
end closure panels hingedly attached to the upper edge of said second pair of opposed flanges and to said cover panels
said end closure panels being divided by a pair of oblique score lines extending outwardly from the inner corners of said end closure panel, said oblique score lines dividing said end closure panel into a central section and two side sections,
said end closure panels having U-shaped score lines, each of said U-shaped score lines being formed of three straight score line sections which meet at said oblique score lines,
each of said three straight score line sections being in a separate central or side section, said three straight score line sections being oriented whereby said straight score line sections in said side sections will be congruent with said straight score line section in said central section when said end closure panel is folded along said oblique score lines,
the distance between the upper edge of said flanges and one of said U-shaped score line sections in said central section being substantially equal to the width of said flange such that a portion of the end closure panels can be folded around the second opposed flanges to secure the cover panels in a closed position.

2. The container of claim 1 further comprising
said container being formed of two parts,
one of said parts being a container body comprising said side panels,
a bottom closure; and
the other of said parts being a top closure element comprising
said cover panels,
said end closure panels; and
said flange comprising
first and second flange members,
said first flange member comprising
a downwardly extending flange element hingedly attached to the upper edge of each of said side panels, and
said second flange member comprising
a flange structure attached to the lower edge of said cover panels and said end closure panels, said flange structure comprising
outer flange elements hingedly attached to the lower edge of said cover panels and said end closure panels, said outer flange elements extending along the outer face of said container body downwardly extending flange elements, and
inner flange elements hingedly attached to the lower edge of said outer flange elements, said inner flange elements extending upwardly between said container body flange elements and said container body side panels.

3. The container of claim 1 in which said one of said U-shaped score line sections in said central section is the U-shaped score line section in said central section nearest said flange upper edge.

4. The container of claim 1 in which said cover panels are dimensioned to meet centrally of said container.

5. The container of claim 1 in which said one of said U-shaped score line sections in said central section is the U-shaped score line section in said central section nearest said flange upper edge.

6. The container of claim 2 in which said cover panels are dimensioned to meet centrally of said container.

7. A blank for a container closure comprising a cover section,
an outer flange section attached to said cover section by a first longitudinal score line and
an inner flange section attached to said outer flange section by second longitudinal score lines,
said first and second longitudinal score lines being parallel,
said cover section being divided by transverse score lines into a pair of opposed cover panels and a pair of opposed end closure panels and a glue flap attached to the outer edge of the outermost of one of said panels,
said outer flange section being divided by said transverse score lines into outer flange elements attached to each of said cover and end closure panels and a glue flap attached to said cover section glue flap,
said inner flange section being divided into inner flange elements hingedly attached to said outer flange elements, each of said inner flange elements being aligned with said attached outer flange elements,
each of said end closure panels being divided by a pair of oblique score lines extending outwardly from the inner corners of said end closure panel, said oblique score lines dividing said end closure panel into a central section and two side sections,
each of said end closure panels having U-shaped score lines, each of said U-shaped score lines being formed of three straight score line sections which meet at said oblique score lines,
each of said three straight score line sections being in a separate central or side section, said three straight score line sections being oriented whereby said straight score line sections in said outer sections will be congruent with said straight score line section in said central section when said end closure panel is folded along said oblique score lines,
the distance between the first longitudinal score line and one of said U-shaped score line section in each of said central sections being substantially equal to the width of said outer flange section such that a portion of the end closure panels can be folded around the flange sections to secure the cover panels in a closed position.

8. The container closure blank of claim 7 in which said one of said U-shaped score line sections in said central section is the U-shaped score line section in said central section nearest said first longitudinal score line.

9. A blank for a container comprising
a cover section,
an outer flange section attached to said cover section by a first longitudinal score line and
an inner flange section attached to said outer flange section by a second longitudinal score line,
side panels connected to said inner flange section by third longitudinal score lines,
said first, second and third longitudinal score lines being parallel,
said cover section being divided by transverse score lines into a pair of opposed cover panels and a pair of opposed end closure panels and a glue flap attached to the outer edge of the outermost of one of said panels,
said outer flange section being divided by said transverse score lines into outer flange elements attached to each of said cover and end closure panels and a glue flap attached to said cover section glue flap,
said inner flange section being divided by transverse slots into inner flange elements hingedly attached to said outer flange elements, said transverse slots being aligned with said transverse score lines,
each of said end closure panels being divided by a pair of oblique score lines extending from centrally of the outer edge of said end closure panel to the inner corners of said end closure panel, said score lines dividing said end closure panel into a central section and two side sections,
each of said end closure panels having U-shaped score lines, each of said U-shaped score lines being formed of three straight score line sections which meet at said diagonal score lines,
each of said three straight score line sections being in a separate central or side section, said three straight score line sections being oriented whereby said straight score line sections in said outer sections will be congruent with said score line section in said central section when said end closure panel is folded along said oblique score lines,
the distance between the first longitudinal score line and the nearest U-shaped score line section in said central section being substantially equal to the width of said outer flange section such that a portion of the end closure panels can be folded around the flage sections to secure the cover panels in a closed position.

10. The container blank of claim 9 in which said one of said U-shaped score line sections in said central section is the U-shaped score line section in said central section nearest said first longitudinal score line.

11. The container blank of claim 9 in which bottom closure members are attached to said side panels.

* * * * *